Dec. 1, 1970    P. S. PRICE ET AL    3,544,415
REINFORCED ELASTOMERIC BEARING
Filed March 20, 1967    2 Sheets-Sheet 1

INVENTORS
PAUL S. PRICE
WILLIAM M. SLATER
BY
Mann, Brown & McWilliams
ATTORNEYS

Dec. 1, 1970    P. S. PRICE ET AL    3,544,415

REINFORCED ELASTOMERIC BEARING

Filed March 20, 1967    2 Sheets-Sheet 2

INVENTORS
PAUL S. PRICE
WILLIAM M. SLATER
BY
Mann, Brown & McWilliams
ATTORNEYS

United States Patent Office 3,544,415
Patented Dec. 1, 1970

3,544,415
REINFORCED ELASTOMERIC BEARING
Paul S. Price and William M. Slater, Toronto, Ontario,
Canada, assignors to Conenco Canada Limited, a corporation of Canada
Filed Mar. 20, 1967, Ser. No. 624,320
Int. Cl. B32b 1/04; E01d 19/06
U.S. Cl. 161—44                                     5 Claims

ABSTRACT OF THE DISCLOSURE

A bearing pad structure of laminated natural rubber layers and metal plates with a synthetic rubber layer adhered to the sides of the pad. The synthetic rubber is used to resist ozone deterioration.

---

The present invention is directed to improvements in bearing pad structures which may be utilized for supporting superimposed loads such as that found in the elements of a bridge which are supported on a pier or an abutment.

In recent years, bearing pads of this type have been made from laminated elastomers with steel plates formed between layers of the elastomers in order to provide a reinforcing effect, thus reducing the vertical strain and bulging at the edges of the bearing pads so defined. Bearing pads of this type are necessarily supplied in a wide variety of sizes and the production of such pads has necessarily required the use of a large number of molds to accommodate the large number of sizes of bearing pads so used. These bearing pads are subjected to lateral, vertical and rotational movement due to such forces of superimposed weight, gravity, wind and dimensional changes due to varying temperatures, creep and shrinkage of the materials in the bridge. They are also subjected to aging, ozone attack, oxidation, and effects of the weather. In places where temperatures vary widely, the varying temperature conditions may adversely affect the performance of the bearing pad.

Some prior bearing pads have utilized synthetic rubber compounds in the various layers between the steel plate stiffeners and these synthetic rubber compounds, a common example of which is neoprene, provide superior aging characteristics and resist ozone deterioration better than natural rubber compounds. However, these synthetic rubber compounds do not perform as well under widely varying temperature conditions as do many of the natural rubber compounds. The resiliency of synthetic rubber compounds diminishes greatly with sub-zero temperatures. At 60 degrees below zero Fahrenheit, some synthetic rubber compounds such as neoprene have substantially less resiliency than some natural rubber compounds. A loss in resiliency naturally impairs the bearing function and consequently adversely affects the structure supported by the bearing.

With the foregoing in mind, the major purposes of the present invention are to so form bearing pad structures of laminated elastomer thicknesses and steel plate stiffeners that the end product will withstand effects of ozone deterioration and aging better than previous bearing pads while at the same time, the bearing pad operates successfully through a wide range of temperatures to which the bearing pad is exposed, all while at the same time enabling the production of such bearing pads at a cost less than what has been encountered heretofore, these and other objects of the invention being more apparent in the course of the ensuing specification and claims, when taken with the accompanying drawings, in which:

Figure 1:
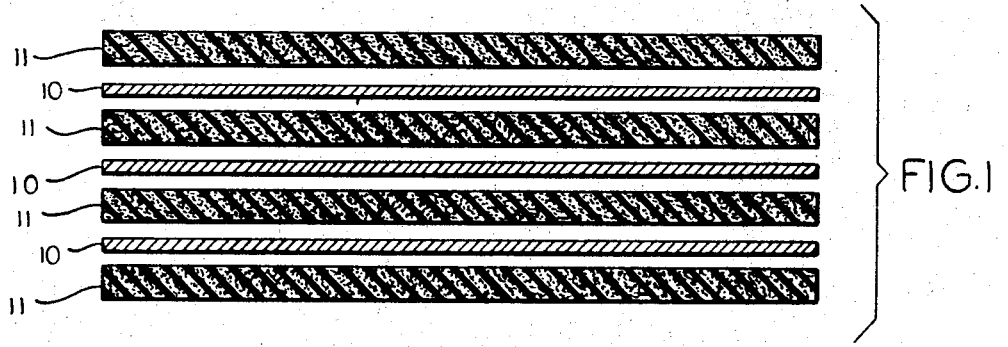
FIG. 1 is a diagrammatic view of one of the initial steps utilized in the method disclosed herein.
Figure 2:
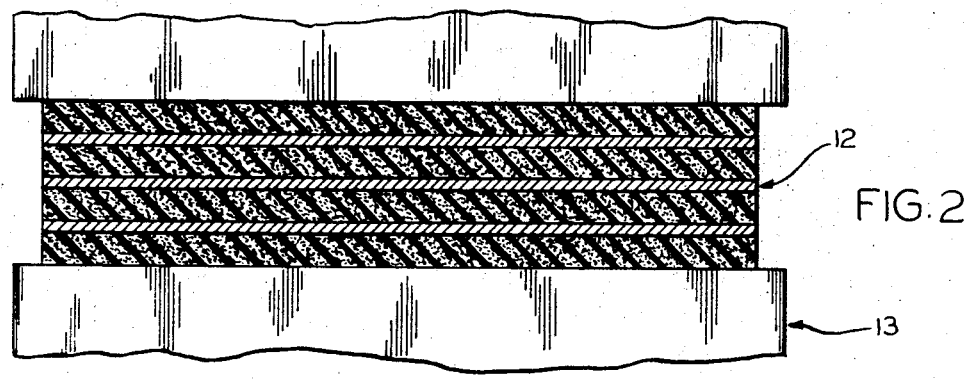
FIG. 2 is a diagrammatic illustration of a subsequent step utilized in the method disclosed herein.

According to the present invention, bearing pads for bridge structures and the like are made by first laminating large sheets of steel and natural rubber compounds. This is done, for example, by forming sheets or layers of natural rubber compounds in a size up to four by eight feet with a thickness of three-eighths inch to approximately one inch. Thinner layers of about one-fourth inch thickness may be used for the top and bottom layers. Steel stiffener plates of a size four feet by eight feet and with a thickness of on the order of .03 to .250 inch are then sand blasted and coated with an adhesive such as a rubber based heat curing adhesive. The steel plates 10 and rubber layers 11 are superposed one over the other and a sandwich of the alternating layers of steel plate and rubber layers is made as appears in FIG. 1. The layers are brought into contact with one another with the adhesive on the faces of the steel in contact with the faces of the rubber. This sandwich 12, as appears in FIG. 2, is then put in a conventional vulcanizing press 13 wherein heat and pressure are applied to vulcanize the rubber to the metal as appears in FIG. 2. The sheets so formed may of course be made up in sizes which are smaller or larger than the four-foot by eight-foot size mentioned.

Figures 3, 5:
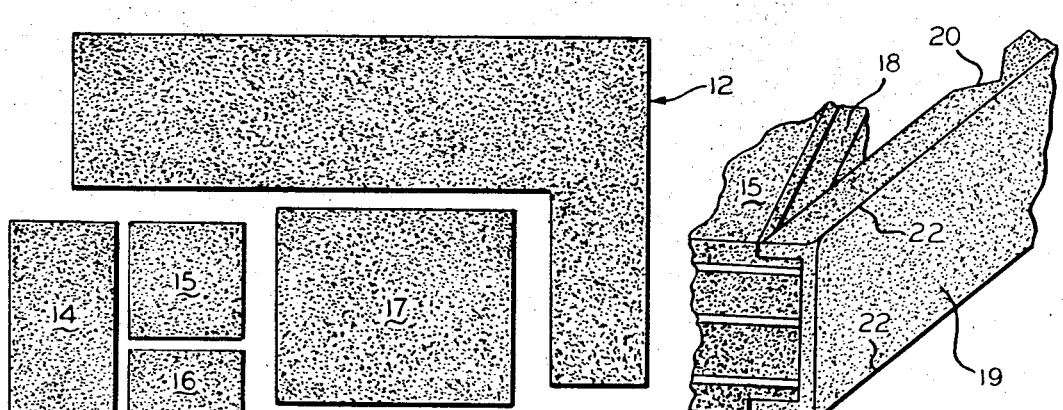
FIG. 3 is a diagrammatic view of another step utilized in the method herein disclosed.
FIG. 5 is a diagrammatic view of a still further step utilized in the method disclosed herein.
Figure 4:
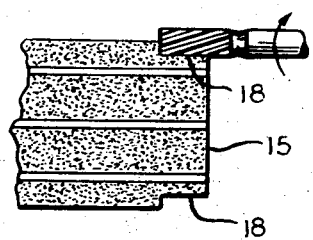
FIG. 4 is a sectional view in diagrammatic form of another step utilized in the method disclosed herein.

These large sheets are then used to produce bearing pads. A band saw or the like may be utilized to cut the size of bearing pads needed from these large prefabricated sheets. This is indicated by the individual pads 14, 15, 16 and 17 in FIG. 3. Such bearing pads, for example, may range in size from approximately two inches by two inches by the thickness of the sheet to four feet by eight feet by the thickness of the sheet which has previously been formed. After the desired size of bearing pad has been cut from the prefabricated laminated structure, rabbets 18 are formed on the marginal face portions of the upper and lower surfaces of the pad by cutting these portions as appears in FIG. 4. After this operation is performed, a generally U-shaped member or casing 19, which is preferably formed as an extruded strip of neoprene compound or other rubber compound selected for its resistance to ozone attack, oxidation and aging, is applied to the sides of the bearing pad element and into the recessed portions of the upper and lower faces of the bearing pad element as appears in FIG. 6. This side casing is preferably formed from a synthetic rubber compound which has superior age resistance, weather resistance and resistance to oxidation or ozone attack compared with the interior compound. This U-shaped member has a thickness of the order of ⅛ to a quarter of an inch and the thickness matches the depth of the rabbets 18. The legs of the element 20 match the width of the rabbets 18. In order to wrap this sheath-like covering member around the bearing pad, cut out portions may be made in the upper and lower faces of the protective element to enable formation of a neat bend of the strip at the corner 21 as appears in FIG. 6.

An adhesive such as a rubber based heat curing adhesive is employed to secure the inner portions of the channel 19 to the portions of the pad element 15 in contact therewith. The channel element is wrapped completely around the pad element 15 and thus serves to fully enclose the sides of the pad element while overlying and underlying the marginal portions of the bearing faces of the pad element. Heat is then applied to cure the adhesive bond between the channel and pad layers.

The result is a composite bearing pad with the load bearing elastomeric layers being formed from a material which maintains elasticity over a wide temperature range while the portions of the pad most subject to oxidation, ozone attack and aging are formed from an elastomeric compound best suited to resist oxidation, ozone attack and aging.

Figure 7:
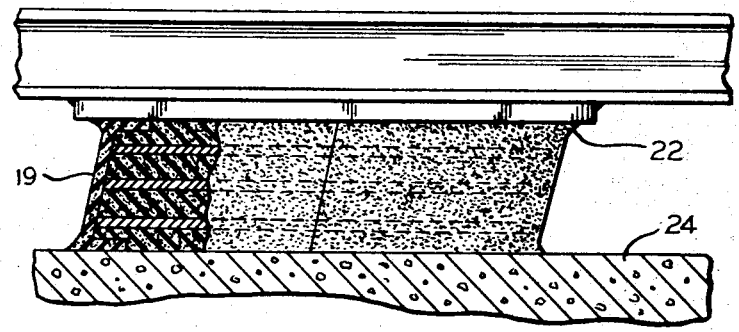
FIG. 7 is a side view, partially in section, of a bearing pad assembled in supporting relation to a beam and pier construction.

It is preferred that the side closing member 19 have a projecting shoulder 22 at the upper and lower outwardly facing corner edges thereof so that when the assembled pad is in load supporting position as is indicated in FIG. 7, the shoulders 22 are distorted to make a good seal all the way around the marginal portions of the bearing pad. This helps to seal the upper and lower faces of the bearing pad to a superposed beam as indicated at 23 and an underlying pier or bearing seat as indicated at 24 in FIG. 7. The seal helps to protect against aging ozone deterioration of the upper and lower faces of the assembled pad.

Figure 6:
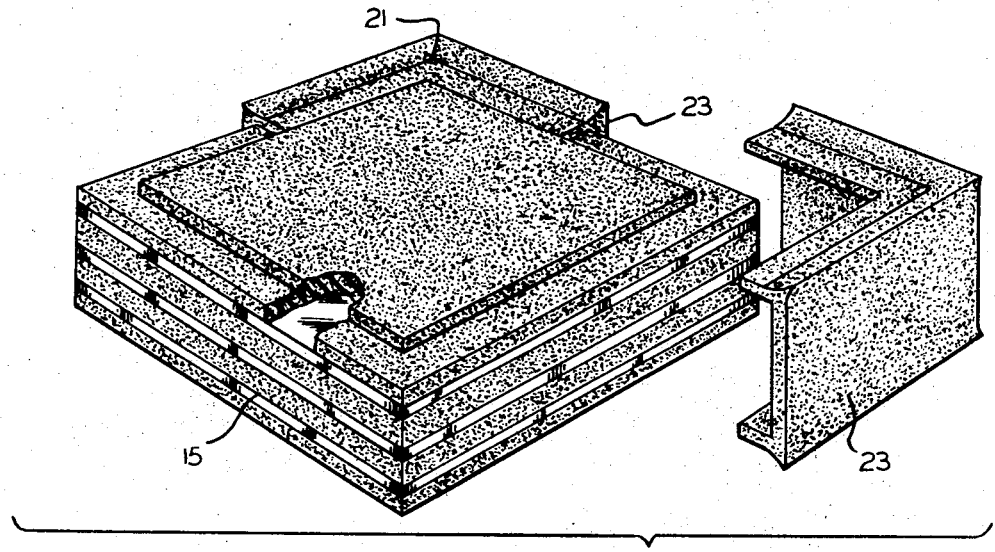
FIG. 6 is a perspective view of a variation to the method utilized herein.
Figure 9:
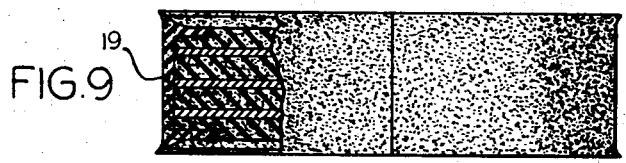
FIG. 9 is a side view, partially in section, of a bearing pad formed in accordance with the principles of the invention disclosed herein.

In lieu of using an elongated strip 19 for enclosing the sides and upper and lower marginal portions of the faces of the bearing pads, individual sections may be molded, fitted over and fixed to the rabbeted portions of the bearing pad element as is indicated by the separately molded channel elements 23 in FIG. 6. These separately molded elements have the same cross sectional configuration as that indicated in the strip 19 in FIG. 5.

In lieu of molding separate elements to define corners as is indicated in FIG. 6, separate channel members may be made for each side of the bearing pad as by cutting an elongated channel strip to the proper lengths to match the sides.

Figure 8:
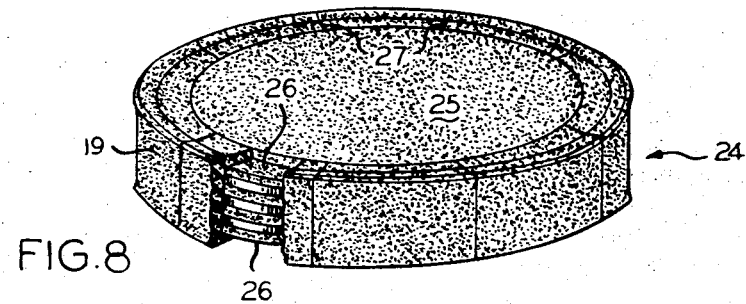
FIG. 8 is a perspective view and partly in section while illustrating a varying form of the invention.

The principles of the invention may be applied to bearing pads which are of a shape differing from the square or rectangle. This is indicated in FIG. 8 wherein a circular bearing pad is generally designated at 24. The pad element 25 is cut from the large sheet to the desired shape and then the channel strip 19 is applied over the side of the pad and over the upper and lower rabbeted portions 26 in the upper and lower marginal face portions of the element 25. The strip may be cut at appropriate intervals as is indicated at 27 to enable a neat formation of the circle around the circular bearing pad element.

It should be understood that any number of layers of rubber and steel plate may be utilized to build up any desired thickness in accordance with load bearing design considerations while utilizing the principles disclosed herein.

It is preferred to use an elastomeric compound in the several layers 11 of the pad equivalent to A.S.T.M. specification 4AA 525 A13 B13 with a hardness durometer in the range of 45 to 70. This is a natural rubber compound. This compound should have a low temperature stiffness as measured by the effective shear modulus or modulus of rigidity not exceeding 120 p.s.i. at minus 40° Fahrenheit and 180 p.s.i. at minus 60° Fahrenheit. The shear modulus should be calculated from horizontal force measurements recorded while horizontally straining an actual prototype bearing at a constant rate of increase from 0 to the full design deflection of the bearing through a temperature drop from 80° Fahrenheit to minus 60° Fahrenheit. The horizontal force measurements should be recorded 20 minutes after reaching a constant deflection value at each incremental increase of deflection. The measurements should be taken with the minimum rated vertical load applied to the bearing. This elastomeric compound in the several layers 11 of the pad should also have an elastomer to metal adhesion factor of not less than 15# per lineal inch. It is preferred to use an elastomeric compound in the channel edge strip generally equivalent in ozone resistance, aging and weathering resistance equivalent to an elastomeric compound designated by A.S.T.M. specification 2BC 520 A14, B14, G19. This a neoprene synthetic rubber compound. The hardness durometer of the casing or edge enclosing strip should also be in the range of 45 to 70. The elastomeric compound in the casing should have the characteristic of showing no cracks when exposed for 100 hours at 100° Fahrenheit in an atmosphere having 100 parts of ozone per 100 million parts of air.

The width and depth of the rabbets 18 should be such with relation to the load bearing facial area of the bearing pad that the bearing pad element itself takes all of the load of the superposed structure so that the bearing pad elements of natural rubber compounds and steel plates resist the vertical, horizontal and rotational forces of the load.

By reason of the method employed herein, large sheets as described herein may be prefabricated in varying thicknesses and simply stored. When bearing pads are needed, the particular thickness of pad desired is selected and a prefabricated sheet of this size is then cut to provide the facial area of bearing pad desired. Thus, by reason of the method herein disclosed, it is unnecessary to use different sizes of molds for each different size of bearing pad desired. One need only have molding equipment necessary to produce the large prefabricated sheets. When manufacturing a large number of bearing pads of the same size, it is convenient to make the large sheets of a size which is a multiple of the size of the pads.

By reason of the use of the natural rubber compound for the bearing portion of the structure, it is possible to obtain superior performance through an extremely wide range of temperatures to which the bearing pads are exposed. At the same time, the synthetic rubber protective and covering element around the sides and upper marginal areas of the structure provide superior characteristics with respect to aging, oxidation, and ozone attack. It should be noted that when in use, the superimposed beams or piers will overlie and underlie the upper and lower facial areas of the bearing pad structure and by virtue of this contact, the facial areas of the pad structure which are formed from the natural rubber compound and which lie inwardly of the marginal areas, are thus covered by the beam, pier, abutment or other members between which the bearing element is positioned. The greatest areas of aging and ozone attack on these bearing elements reside at the marginal portions of the element where the synthetic rubber is employed to resist such attack. The high stresses which exist at the edges of bearing pads in use are particularly vulnerable to ozone attack and the protective casing provides superior resistance at the edges.

The use of the natural rubber compound or equivalent in the bearing pad element itself results in good flexibility under very widely varying temperature conditions and even at temperatures as low as minus 60° Fahrenheit and as high as approximately 130° Fahrenheit. Any stiffening of the channel-like protecting strip 19 which occurs at the temperatures used does not adversely affect the pad because the load is taken by the pad element and the protecting channel strip is not depended upon to impart any flexibility to the pad in absorbing the load.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:

1. A bearing pad of laminated elastomeric and metallic plate material defined by laminated layers of an elastomeric natural rubber compound material and metal plate means with the elastomeric material being positioned in layers between said plates and at the upper and lower faces of the pad structure to form a pad of predetermined thickness and load bearing area, the marginal portions of the upper and lower faces of said layers being cut away, and a generally U-shaped protective sheath of elastomeric synthetic rubber compound material extending around the sides of the pad and having leg portions fitting into said marginal portions, said sheath being fixed to said pad and exposed to the exterior.

2. A bearing pad as set forth in claim 1 wherein said sheath is an elastomeric material selected for the properties of resisting aging and ozone deterioration, and said elastomeric material in said layers is selected for the property of maintaining sufficient flexibility for load bearing purposes through a temperature range of on the order of minus 60° to 130° Fahrenheit.

3. A bearing pad of laminated elastomeric and metallic plate material defined by laminated layers of an elastomeric natural rubber compound material and metal plate means, said elastomeric material being positioned between said plate means and at the upper and lower faces of the pad structure to form a pad of predetermined thickness and load bearing area, and a protective elastomeric covering of a synthetic rubber compound fixed to the side portions of the bearing pad so formed, said covering extending all the way around the pad and having a thickness such as to perform substantially no load bearing function when the bearing pad is subjected to a superimposed load, the elastomeric material in said layers being of a type to maintain flexibility over a wide temperature range while the elastomeric material in said covering is of a different type selected to resist aging and ozone deterioration.

4. A bearing pad as set forth in claim 3 wherein said pad and said covering have interfitting groove and projection means.

5. A bearing pad as recited in claim 4 characterized by and including a projection extending outwardly from the upper and lower margins of the pad to provide a seal at the margins of said pad when said pad is disposed between load carrying members.

References Cited

UNITED STATES PATENTS

| | | | |
|---|---|---|---|
| 1,647,428 | 11/1927 | Atwood | 248—22 |
| 1,690,229 | 11/1928 | Jenkins | 161—114 |
| 3,349,418 | 10/1967 | Hein | 308—3 |
| 3,375,763 | 4/1968 | Welch | 14—16 |

FOREIGN PATENTS 696,512 10/1904 Canada.

DOUGLAS J. DRUMMOND, Primary Examiner

U.S. Cl. X.R.

14—16; 161—221; 248—22; 308—3